SIGNAL REDUNDANCY UTILIZING SLOPE LIMITING LINES

Filed Aug. 5, 1964 2 Sheets-Sheet 1

INVENTOR
EDWARD B. GLOVER
BY Hurvitz & Rose
ATTORNEYS

March 28, 1967 E. B. GLOVER 3,311,909

SIGNAL REDUNDANCY UTILIZING SLOPE LIMITING LINES

Filed Aug. 5, 1964 2 Sheets-Sheet 2

INVENTOR
EDWARD B. GLOVER

BY Hurvitz & Rose

ATTORNEYS

United States Patent Office 3,311,909

Patented Mar. 28, 1967

3,311,909
SIGNAL REDUNDANCY UTILIZING SLOPE LIMITING LINES

Edward B. Glover, Melbourne Beach, Fla., assignor to Radiation Incorporated, Melbourne, Fla., a corporation of Florida Filed Aug. 5, 1964, Ser. No. 387,562
5 Claims. (Cl. 340—345)

The present invention relates generally to telemetry systems and more particularly to variable transmission rate telemetry systems wherein data is transmitted only when the event being monitored lies outside a pair of upper and lower slope limiting lines or fans.

The requirement for effective systems wherein redundancy in data transmitted from missiles is considerably reduced has received considerable attention. Since missile and space craft data handling systems are generating larger and larger amounts of data, as the size and complexity of the missiles and space craft increase, the telemetry links between these devices and the ground receiver are requiring unreasonably wide bandwidths. Wide bandwidth is necessary because every monitored parameter is sampled at a constant rate that is at least twice the highest frequency of any parameter. As the number of monitored channels increases, the sampling rate must be increased to satisfy the above requirement. Increasing the data sampling rate requires wider band width links so that a compromise between bandwidth and the amount of information transmitted must be reached.

The present invention affords relief from this dilemma by relying upon the fact that the monitored information is, primarily, of a low frequency nature. In consequence, according to the present invention, data is transmitted at a rate determined by the frequency of the monitored event. If the monitored data is following a predetermined law of variation, within bounds, no signals are transmitted until the data exceeds those bounds. Thereby, redundant data, i.e. data having no significant information content outside the bounds known at the receiver from the predetermined variation law, is not transmitted and data transmission efficiency is considerably increased. At the receiver, the data points are collected and the parameter at the transmitter is ascertained by interpolating, according to the known variation law, between adjacent received points.

In the system of the present invention, the known law of variation is assumed to be a linear function of time. By transmitting data points only when the monitored parameter differs from a particular linear function, the receiver can reconstitute the monitored parameter by linearly interpolating between the transmitted points.

According to the present invention, a series of upper and lower slope limiting lines or fans are produced between the first sample $y_1$ of an interval and points $y_n \pm \delta_{max}$. If $y_{n+1}$ lies outside the limits defined by these converging lines, $y_n$ is considered as non-redundant, hence is transmitted. To insure converging of the limiting lines even though the event being monitored changes slope direction, the slopes of adjacent limiting lines are compared and the successive line is taken as the limit only if it will result in convergence.

It is, accordingly, an object of the present invention to provide a variable transmission rate telemetry system wherein only non-redundant data is transmitted.

Another object of the invention is to provide a telemetry system wherein data is transmitted only when it differs from a known law of variation by a predetermined amount.

A further object of the invention is to provide a telemetry system wherein data is transmitted only when the value of an event being monitored differs from a linear time function by a predetermined value.

A further object of the invention is to provide a telemetry system wherein data is transmitted only when the value of an event being monitored falls outside the limits defined by a pair of lines that converge to a line determined by the sampled values.

An additional object of the invention is to provide a telemetry system that enables low bandwidth operation, wherein maximum information is transmitted by relying only upon the utilization of non-redundant data.

The above and still further objects, features and advantages of the present invention will become apparent upon consideration of the following detailed description of one specific embodiment thereof, especially when taken in conjunction with the accompanying drawings, wherein.

Figure 1:
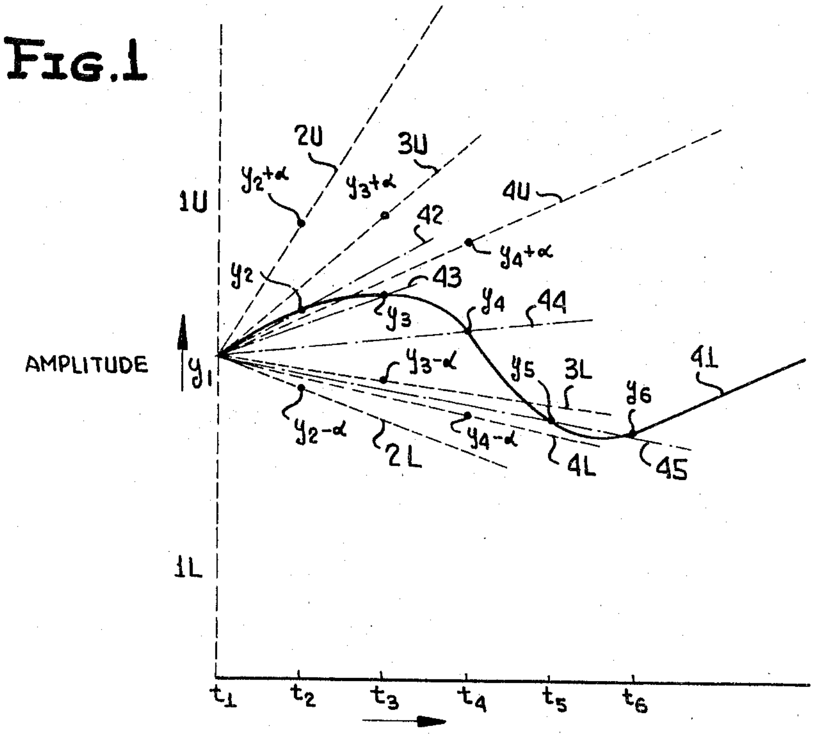
FIGURE 1 is a graph to aid in describing a preferred embodiment of the invention.

Reference is now made to FIGURE 1 of the drawings where the procedure for determining when a point to be transmitted according to the preferred embodiment is disclosed. According to this method, the slopes of converging lines drawn between the first point $y_1$ of function 41 and successive points $y_2$, $y_3$ etc. at equally spaced times $t_2$, $t_3$ etc. along the function are compared with the slopes of successively converging lines originating at $y_1$ and intercepting the points $y_2 \pm \alpha$, $y_3 \pm \alpha$, etc., where $\alpha$ is a predetermined vertical increment. A data point $y_{n-1}$ is transmitted when the slope of the line between $y_1$ and $y_n$ lies outside the converging lines.

In FIGURE 1, a pair of vertical lines 1U and 1L are directed upwardly and downwardly from point $y_1$. Since these lines define the limits within which $y_2$ may lie, it becomes apparent that $y_2$ may have any value and still be within the limits of the area to the right of 1U and 1L. Thus line 42, the straight line between points $y_1$ and $y_2$, has a slope, $$m_{1-2} = \frac{y_2 - y_1}{t_2 - t_1} = \frac{\Delta y_{2-1}}{\Delta t}$$

between the limit lines 1U and 1L. New upper and lower limiting lines 2U and 2L are now drawn from $y_1$ to $(y_2+\alpha)$ and $(y_2-\alpha)$, respectively, and line 43 is drawn between $y_1$ and $y_3$. Since the slope of 2U is less than the slope of 1U, the former is selected as a new upper limiting line; 2L is selected as a new lower limiting line since its slope is greater than that of 1L. The slope of line 43, $$m_{1-3} = \frac{\Delta y_{3-1}}{2\Delta t}$$

falls between the slopes of 2U and 2L, which are $$m_{2u} = \frac{y_2 + \alpha - y_1}{\Delta t} \text{ and } m_{2L} = \frac{y_2 - \alpha - y}{\Delta t}$$

respectively. This determination is made by ascertaining that $m_{2u}$ is greater than $m_{1-3}$ and that $m_{2L}$ is less than $m_{1-3}$, i.e., $m_{2u}$ is more positive than $m_{1-3}$ and $m_{1-3}$ is more positive than $m_{2L}$. In consequence, $y_2$ is redundant, is not necessary in determining function 41 within the desired system accuracy and need not be transmitted.

Point $y_4$ is now investigated by drawing (1) line 44 between $y_1$ and $y_4$ and (2) limiting lines 3U and 3L, the first intercepting $y_1$ and $(y_3+\alpha)$ and the second intercepting $y_1$ and $(y_3-\alpha)$. For the same reasons discussed supra with regard to selection of 2U and 2L, 3U and 3L are now selected as the next upper and lower limiting lines. Since the slope of line 44, $$m_{1-4}=\frac{y_4-y_1}{3\Delta t}$$

is between the slopes of 3U and 3L, $$m_{3u}=\frac{y_3+\alpha-y}{2\Delta t}, \text{ and } m_{3L}=\frac{y_3-\alpha-y}{2\Delta t}$$

$y_3$ also is redundant.

The lines 45, 4U and 4L are all now drawn from $y_1$ to intercept the points $y_5$, $(y_4+\alpha)$ and $(y_4-\alpha)$, respectively. As before, the line 4U it utilized to consider whether the investigated point, $y_5$ is within the fan of the limiting lines. The line 4L, however, is not so utilized because its slope is less than that of 3L, i.e. the slope of 4L is more negative than the slope of 3L. The retention of line 3L as the lower slope results from a requirement that the upper and lower limiting lines always converge.

Considering whether $y_4$ is redundant or not, the slope of line 45, $$m_{1-5}=\frac{\Delta y_{5-1}}{4\Delta t}$$

is less than the slope, $m_{3L}$, of 3L. Thus, $y_5$ is not within the sector defined by lines 4U and 3L, so $y_4$ is the last point within the converging fan of limit lines, is non-redundant and must be transmitted.

At the receiver, a straight line is drawn between the transmitted points $y_1$ and $y_4$ to give an approximate indication of the value of function 41 between $t_1$ and $t_4$ with a minimum number of transmitted points. If the line 4L, rather than 3L is utilized as the lower limit for $y_5$, no information regarding $y_4$ would be transmitted since $m_{1-5}$ is greater than $m_{4L}$. As a result, the receiver would not be appraised of the rise in function 41 as it progresses from $t_1$ to $t_4$.

After point $y_4$ is transmitted, a new computation cycle is initiated using that point as the reference in the same manner that $y_1$ was previously employed.

Figure 2:
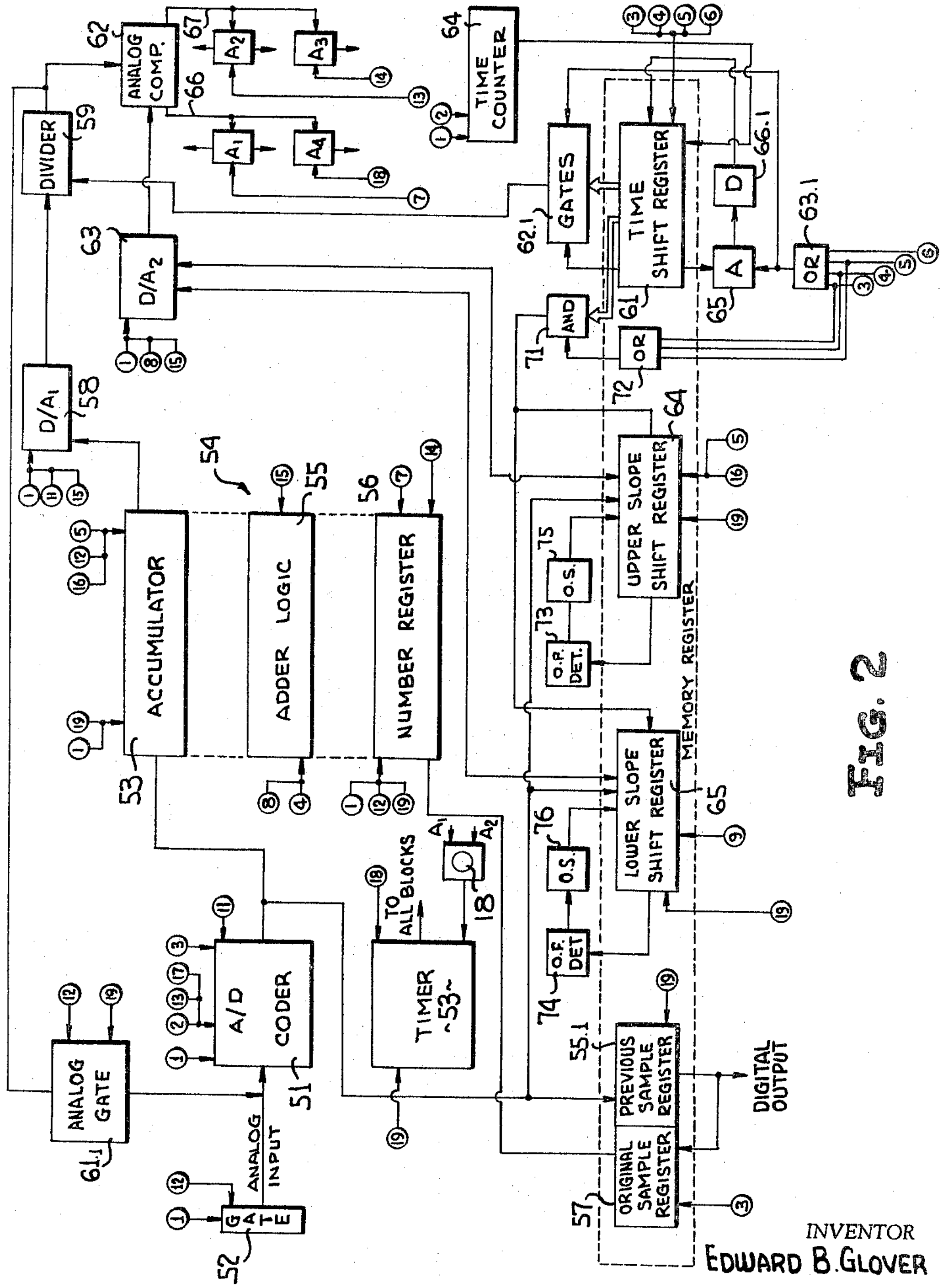
FIGURE 2 is a block diagram of the embodiment operating in accordance with FIGURE 1.

The apparatus utilized to determine when a point is to be transmitted according to the scheme illustrated by FIG. 1 is shown schematically in FIG. 2. A low frequency analog input signal, of the type generated by a strain gage accelerometer on a missile, is applied to analog to digital converter 51 via input gate 52. Converter 51 includes an output storage register from which is derived a parallel, multi-bit binary signal indicative of the analog signal at times $t_1$, $t_2$ etc.

The control of signal flow to coder 51 and input gate 52 is in response to output pulses derived from 19 state sequencer or timer 53. While connections are not drawn between timer 53 and the elements controlled thereby, they are represented by circles having numerals indicative of the various timer stages that are connected to the computer components by appropriate lines. Thus, input gate 52 is opened and closed in response to the first and twelfth timer pulse, respectively, while coder 51 is cleared in response to the first timer pulse, has its storage set in response to the second, thirteenth and seventeenth timer pulses, and has its storage readout to accumulator 53.1 of arithmetic unit 54 and previous sample register 55.1 when the third and eleventh timer pulses are respectively derived. Register 55.1 is readout to the transmitter and original sample register 57 only when the nineteenth timing pulse is generated.

Arithmetic unit 54 includes an adder logic section 55 that decrements the number stored in accumulator 53.1 by the count in number register 56 when the fourth and eighth timing pulses are derived. Adder unit 55 is also responsive to the fifteenth timer pulse in a manner whereby the accumulator 53.1 is advanced by the count stored in number register 56. Information indicative of the value of the original or first sample in each sampling sequence is transferred into register 56 from original sample register 57 in response to the third timing pulse. Register 56 is loaded with numbers indicative of $\alpha$ and $2\alpha$ from prewired storage when the seventh and fourteenth timing pulses are respectively generated. It is cleared in response to the first, twelfth and nineteenth timing pulses being derived.

The contents of accumulator 53.1 are readout to digital to analog converter 58 upon the derivation of the fifth, twelfth and sixteenth pulses. Converter 58 applies the most recently readout number of accumulator 53.1 as the analog dividend input to high speed hybrid divider 59 except when the converter is being cleared during the first, eleventh and fifteenth timing pulses. The binary divisor input to divider 59, indicative of current time relative to the occurrence time of the original sample, is applied in parallel from all but the most significant stage of five stage shift register 61 via gates 62.1. Gates 62.1 are opened only when a binary one is in the most significant stage of register 61 and when any of the timing pulses between three and six is generated, as determined by the output of OR gate 63.1.

To enable register 61 to store a time indicating signal, five bit or 32 state time counter 64, AND gate 65.1 and delay stage 66.1 are provided. Counter 64 is indexed, i.e. has its count advanced by a binary one, in response to the first timing pulse and is reset to a binary one when the nineteenth timing pulse is produced. The count of counter 64 is readout, in parallel, to shift register 61 in response to timing pulse number two. To provide a binary time indication, the contents of register 61 are shifted left (e.g. from 0011 to 0100. AND gate 65.1 is enabled only in response to a binary zero in the most significant stage of register 61. Enabling gate 65.1 couples the output of OR gate 61 through delay 66, to the least significant stage of register 61. The amount of delay introduced by element 66.1 is sufficient to prevent loading of the first stage of register 61 by the last register stage during readout. The delay is less than the interval between adjacent timing pulses so that the contents of the last stage are in the first stage when the next pulse from sequencer 53 occurs.

Since the binary divisor input to divider 59 is indicative of time from the original sample to the present and the dividend output of converter 58 represents the values of points on the function relative to the original sample value, as seen infra, the output of divider 59 represents the slopes of the various lines considered in FIG. 1. The output of divider 59 is coupled back to coder 51 through analog gate 61.1 when the latter is opened, i.e., when the gate is enabled, between termination of timing pulses twelve and eighteen. The slope indications deriving from divider 59 are at all times compared in high speed analog comparison circuit 62 with the upper and lower limit slopes generated by digital to analog converter 63. Converter 63 is cleared when timing pulses, one, eight and fifteen are generated to enable different comparisons to be made with the same circuit during a single computation cycle.

Binary indications of the upper and lower slope limits, 1U, 1L, 2U, 2L etc., are read into converter 63 from shift registers 64 and 65 only when the sixteenth and ninth timing pulses are respectively generated. This is a parallel operation with signals from all stages of either register 64 or 65 being simultaneously read into the corresponding converter stages. At the beginning of each sampling cycle, i.e. the first time a particular original sample is read into register 57, each stage of registers 64 and 65 is loaded in response to the nineteenth timing pulse with a binary one and zero, respectively. This provides initial slope indications commensurate with the lines 1U and 1L. Lower slope limits are thereafter selectively read into register 65 from coder 51 when timing pulse 14 generated, provided the slope, $m_{nL}$ for the lower limit of the most recently sampled point is greater than the previous lower limit slope $m_{(n-1)L}$. Comparison circuit 62 and AND gates $A_3$ and $A_4$ are utilized to determine which slope is greater. AND gate $A_3$ is enabled by the output of circuit 62 on lead 67 and timing pulse fourteen only if the $m_{nL}$ output of divider 59 is greater than the $m_{(n-1)L}$ output of converter 63. Only when gate $A_3$ is enabled, is the output of coder 51 coupled to register 65.

After 1U has been read from register 64, upper slope limits are read into it from coder 51 via the enabling circuit provided by AND gate $A_4$. Gate $A_4$ is enabled only when timing pulse eighteen occurs and comparison circuit 62 produces an output on lead 66. The latter event occurs when the $m_{(n-1)U}$ output of converter 63 is greater than the $m_{nU}$ output of divider 59. If either of gates $A_3$ or $A_4$ is not enabled, the respective register 64 or 65 retains the previous slope limits $m_{(n-1)U}$ or $m_{(n-1)L}$ even though the system begins to analyze a new point, $n+1$.

The counts stored in registers 64 and 65 are shifted left by one place whenever a binary count of 10000 is reached by time register 61. Such a counter indicates that time counter 64 is set at $2^n$ where $n$ is any integer from zero to four, inclusive. Shifting is accomplished by sampling all five stages of register 61 with AND gate 71 when timing pulses three through six are generated, as determined by OR gate 72. If the most siginficant shift register 61 stage has a binary one and the other four stages have binary zeros when a binary one is produced by gate 72, gate 71 supplies a control pulse to registers 64 and 65 to shift their contents left one place, hence multiply the numbers stored therein by a decimal two or binary 10. The contents of registers 64.1 and 65 are multiplied by two since divider 59 is capable of dividing only by numbers between one and two, as seen infra. Thus, it is necessary to multiply the divisor inputs to divider 59 by two, or a factor thereof, whenever division by two is accomplished.

As a further feature, registers 64 and 65 are maintained at their maximum indicating counts 11111, commensurate with the digital number 31, even if the slope applied thereto exceeds the maximum register count. If they are driven or shifted to a point where their most significant stages are driven to overflow, this is sensed by detectors 73 and 74. When either detector receives an overflow indication, its respective one shot 75 or 76 is activated to load a binary one into each stage of the corresponding register. If overflow is not compensated in this manner, registers 64 and 65 could store numbers considerably less than 31 even though slopes in excess of 31 are applied thereto.

To determine if the slope $m_{1-n}$ falls outside the upper and lower limits stored by registers 64 and 65, AND gate $A_1$, responsive to the signal on lead 66 and timing pulse seven, and AND gate $A_2$, responsive to the signal on lead 67 and timing pulse 10, are provided. Thereby, gate $A_1$ is enabled only when the output of divider 59 exceeds the output of converter 63 and vice versa for gate $A_2$. If $m_{1-n}$ falls outside the upper or lower limits, $m_{nU}$ or $m_{nL}$, one of gates $A_1$ or $A_2$ is activated. Activation of either gate $A_1$ or $A_2$ results in timer 53 being advanced to the nineteenth timing pulse via the connection from gates $A_1$ and $A_2$ through OR gate 78. When timer 53 reaches pulse 19 it advances to the third pulse in its sequence. When it reaches pulse eighteen, timer 53 advances directly to pulse one. The internal timer circuitry is such that the periods between pulse three of every adjacent sampling interval are equal.

Figure 3:
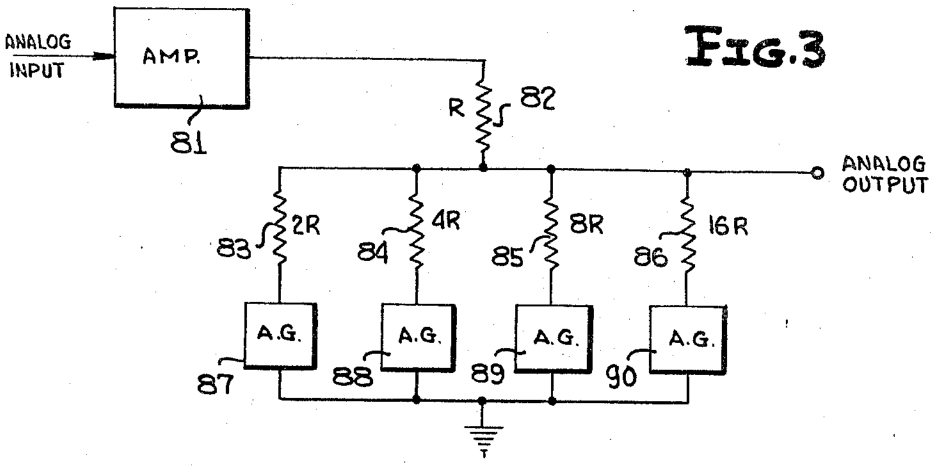
FIGURE 3 is a circuit diagram of a hybrid divider utilized in the circuit of FIGURE 2.

An exemplary circuit that can be utilized as hybrid divider 59 is illustrated in FIG. 3. The analog output of converter 58 is applied through amplifier 81 to resistance 82, having a value of R. Between resistance 82 and ground, four parallel branches including resistances 83–86 are provided. In series with each of resistances 83–86 is a separate gate 87–90, respectively. Each gate is disabled when a binary zero is applied to it and enabled in response to a binary one. To provide division by sixteen equally spaced numbers between one and two, the values of resistances 83–86 are selected as 2R, 4R, 8R and 16R, respectively, and gate 90 is responsive to the lowest order binary bit stored in register 61. The remaining gates are responsive to the higher order binary bits in register 61 according to their reversed numerical denomination. The division circuit functions to divide the analog input in accordance with the following table:

| Digital Code Input Gate | | | | Causes Division by |
|---|---|---|---|---|
| 87 | 88 | 89 | 90 | |
| 0 | 0 | 0 | 0 | 1.0000 |
| 0 | 0 | 0 | 1 | 1.0625 |
| 0 | 0 | 1 | 0 | 1.1250 |
| 0 | 0 | 1 | 1 | 1.1875 |
| 0 | 1 | 0 | 0 | 1.2500 |
| 0 | 1 | 0 | 1 | 1.3125 |
| 0 | 1 | 1 | 0 | 1.3750 |
| 0 | 1 | 1 | 1 | 1.4375 |
| 1 | 0 | 0 | 0 | 1.5000 |
| 1 | 0 | 0 | 1 | 1.5625 |
| 1 | 0 | 1 | 0 | 1.6250 |
| 1 | 0 | 1 | 1 | 1.6875 |
| 1 | 1 | 0 | 0 | 1.7500 |
| 1 | 1 | 0 | 1 | 1.8125 |
| 1 | 1 | 1 | 0 | 1.8750 |
| 1 | 1 | 1 | 1 | 1.9375 |

It is noted from the above table that the analog input to the divisor is never reduced by more than one half, a desirable feature for accurate division. The need for higher accuracy is satisfied by the floating binary point arrangement discussed supra in connection with AND gate 71 as well as registers 64 and 65.

To provide an indication of how the system of FIGS. 2 and 3 operates, function 41 of FIG. 1 is taken as an example by starting at $t_1$. It is assumed that $y_1$ is the original or first sample to be considered in the present operation, hence is stored in register 57 and that $y_2$ is stored in coder 51. Also, assume that counter 64 is set to one, register 64 stores ones in every stage, register 65 stores zeros in every stage, accumulator 53 as well as number register 56 are both cleared and that timer 53 is just being set to step 3, when timing pulse three is about to be generated. The manner by which these assumptions are established will be realized as the description proceeds.

When sequencer 53 advances into state three, the value of $y_2$ stored in coder 51 is transferred to accumulator 53.1. At the same time, $y_1$ is transferred from register 57 to register 56 and time register 61 is shifted from 00001 to 00010. Sequencer 53 now advances into state four where the contents of accumulator 53.1, $y_2$, are decremented by the number in register 56, $y_1$, to give the result $y_2-y_1=\Delta y_{2-1}$. Simultaneously, register 61 is shifted left so it stores 00100.

Timing pulse five is now derived to (1) transfer $\Delta y_{2-1}$ from accumulator 53.1 to converter 58; (2) transfer 1111 from register 64 to converter 63; (3) clear register 56; and (4) set shift register 61 to 01000.

When sequencer 53 advances to step six, register 61 is again shifted, this time to 10000. The one in the most significant digit is sensed to open gates 62, whereby the binary code 0000, the least four significant bits in register 61, is applied as the divisor to divider 59. Since the code 0000 divides the divider input by 1, the difference $$\frac{y_{2-1}}{1=\Delta t}$$

is stored as the slope $m_{1-2}$ by divider 59.

In response to the seventh timing pulse, the 1U count converted to and stored as an analog voltage in converter 63 is compared with the slope of $$\frac{\Delta y_{2-1}}{\Delta t}$$

deriving from divider 59. Since 1U is greater than $$\frac{\Delta y_{2-1}}{\Delta t}$$

no output is derived from comparer 62 on lead 66 and gate $A_1$ is not enabled. At the same time, the maximum permissible, predetermined increment $\alpha$ is supplied to register 56.

Sequencer 53 is now advanced to stage eight when converter 63 is cleared and the $y_2-y_1$ contents of accumulator 53.1 are decremented by $\alpha$, so the accumulator thereafter stores $y_2-y_1-\alpha$. Step nine is now reached and the 0000, $m_{1L}$, contents of register 65 are transferred to converter 63.

The tenth timing pulse is now generated to permit enabling of gate $A_2$ if the $m_{1-2}$ output of divider 59 is less than the $m_{1L}$ output of converter 63, as determined by a pulse on lead 67. Since $m_{1-2}>m_{1L}$, point $y_2$ lies within the specified lower limit and gate $A_2$ is not enabled.

In response to sequencer 53 reaching state 11, converter 58 is cleared and the $y_2$ signal in coder 51 is transferred to register 55.1. Since programmer 53 has reached this point, it has been established that $y_2$ is within the limits set by 1U and 1L. It is necessary to now determine the slopes of the new limiting lines 2U and 2L. Point $y_2$ is now loaded into register 55.1 so that it can be stored and readout if the line between $y_1$ and $y_3$ is outside the boundary established by 2U and 2L.

Step twelve of timer 53 is now attained causing (1) transfer of $(y_2-y_1-\alpha)$ from accumulator 53.1 to converter 58; (2) register 56 to be cleared; (3) disabling of gate 52; and (4) enabling of gate 61.1. Since divider 59 now has as an analog input $y_2-y_1-\alpha$ and a digital code 0000, it derives a voltage proportional to $$m_{2L}=\frac{y_2-y_1-\alpha}{\Delta t}$$

This voltage is applied to coder 51 via gate 61 and is converted into a binary number by the coder when timer 53 reaches step 13.

It is now necessary to determine if $2L>1L$, i.e. ascertain if the successive limits or fans are converging. This is accomplished by comparing the 2L output of divider 59 and the 1L output of converter 63 in circuit 62. Since $2L>1L$, a binary one is derived on lead 67, causing AND gate $A_3$ to be enabled since timer 53 has now reached state fourteen. Enabling gate $A_3$ transfers 2L to register 65 from coder 51. At the same time, number register 56 is set to $2\alpha$.

The fifteenth pulse is now generated causing the $2\alpha$ number loaded in register 56 to be added to the $y_2-y_1-\alpha$ contents of accumulator 53, whereby the accumulator is set to $y_2-y_1+\alpha$. Simultaneously, converters 58 and 63 are cleared so that they are respectively loaded with $(y_2-y_1+\alpha)$ and 1U when the sixteenth timing pulse is derived. At this time, the output of divider 59 is proportional to $$m_{2u}=\frac{y_2-y_1+\alpha}{\Delta t}$$

In response to timer 53 being advanced to state seventeen, coder 51 converts $m_{2U}$ into a binary number that is stored in register 64 when timing pulse eighteen occurs, since $m_{2u}<m_{1u}$. The $m_{2u}<m_{1u}$ decision is made by gate $A_4$, responsive to the binary one output on lead 66 that is derived whenever the output of converter 63 exceeds that of divider 59. Since timer 53 has reached step 18, it resets itself to step one and closes gate 61.

With sequencer 53 at its first stage, clearance of accumulator 53.1, register 56, converters 58 and 63 is effected. Analog gate 52 is again enabled and counter 64 is advanced from 00001 to 00010. The second timing pulse is now generated, whereby the $y_3$ analog sample is coded as well as stored by coder 51 and 00010 is transferred from counter 64 to register 61.

In response to the third timing pulse, $y_3$ goes from coder 51 to accumulator 53.1, $y_1$ is transferred between registers 57 and 56 and register 61 is shifted to 00100. Sequencer 53 now advances to stage four, whereby accumulator 53.1 stores $y_3-y_1$ and register 61 shifts to 01000. When stage five is reached, $y_3-y_1$ goes from accumulator 53.1 to converter 58, 2U goes from shift register 64 to converter 63 and register 56 is cleared. At the same time, register 61 is shifted to 10000 and the 0000 code is loaded into divider 59. When the sixth pulse is generated, AND gate 65 is inhibited by the ONE in the most significant stage of shift register 61. However, AND gate 71 is enabled by the binary code 10000 in shift register 61 and allows the sixth pulse to shift both the upper and lower slope shift registers 64.1 and 65, respectively, to the left one place. This action has left the code 0000 in the least significant bit positions of shift register 61, which code is read into divider 59 via gates 62.1. In consequence, the analog input to divider 59 is divided by one, as previously. The signal deriving from divider 59 is compared with a signal deriving from converter 63 that represents twice the slope of signals previously derived from it. This is because the numbers stored in registers 64.1 and 65 are shifted left one place (i.e. doubled) in response to the 10000 code in register 61. Of course, doubling the slope signals in registers 65 and 64.1 has the same effect as dividing the dividend input or quotient output of divider 59. Since the remaining sequences for investigating points $y_3$ and $y_4$ are substantially the same as those discussed supra, it is not believed necessary to present a complete sequence for them.

The only distinction for investigating $y_4$ with respect to $y_2$ occurs at step 14, utilized to determine if $m_{4L}>m_{3L}$. Since $m_{3L}>m_{3L}$, the latter slope, as stored in coder 51, is not transferred into register 65, which instead retains $m_{3L}$. This is determined by comparator 62. Since $m_{3L}>m_{4L}$, the output of converter 63 exceeds that of divider 59 and lead 67 is not energized when timing pulse fourteen is derived. In consequence, gate $A_3$ is not enabled and register 65 is not coupled to coder 51.

The investigation of $y_5$ to determine if $y_4$ should be transmitted is as described above in connection with $y_2$ until step ten is reached. At this time, a determination is made by gate $A_2$ that the $m_{1-5}$ output of divider 59 is less than the $m_{3L}$ limit stored in register 65. Such a relation between the slopes indicates that $y_5$ is outside the permissible fan limit lines. Gate $A_2$ is thereby energized in response to the signal on lead 67 and the tenth timing pulse is generated to advance timer 53 to stage nineteen.

With timer 53 so set, the non-redundant $y_4$ signal stored in register 55.1 is read out to the transmitter and into register 57 as the original sample for the next computation cycle. Counter 64 and shift register 61 are reset to counts of 00001, registers 64 and 65 are reset to 1U and 1L, respectively, and accumulator 53.1 as well as register 56 are cleared. A new computation cycle is thus ready to begin when timer 53 advances from stage nineteen to three with $y_5$ in coder 51, $y_4$ in register 57 and each of the other components in the system energized exactly as when $y_1$ and $y_2$ were loaded in register 57 and coder 51.

If $m_{1-5}$ were greater than the $m_{4L}$ indication stored in register 64, step 10 is never reached by sequencer 53. Instead, at step seven comparator 62 generates an output that is sampled by gate $A_1$ to advance timer 53 to state nineteen and the same sequence of operations as indicated supra is followed.

It should be noted that if more than one input parameter is involved, as in the case of time division multiplex data, registers 55.1, 57, 61, 64 and 65 of FIG. 2 can be loaded with numbers from a memory that steps in sequence with the multiplexer. Thus, each parameter would have its own numbers for these five registers. The new values of these numbers would be stored following each set of calculations for each parameter and apparatus, in the form of additional sequencer steps, must be provided to transfer the time count to counter 64 at the beginning of each cycle.

While we have described and illustrated one specific embodiment of our invention, it will be clear that variations of the details of construction which are specifically illustrated and described may be resorted to without departing from the true spirit and scope of the invention as defined in the appended claims. For instance, under certain conditions, a binary divider can be substituted for the converters 58, 63 and divider 59.

I claim:

1. In a telemetering system for transmitting data indicative of a monitored signal to a remote location comprising means responsive to said signal for establishing a function having a straight line law of variation, said function including a time, amplitude point on said signal and the values between a pair of successive upper and lower limiting lines including said point, and means responsive to said signal and said function for reading out another time, amplitude point on said signal only when the value of said function differs from the value of the signal by at least a predetermined amount.

2. In a telemetering system for transmitting data indicative of a monitored signal to a remote location comprising means responsive to said signal for establishing a function having a straight line law of variation, said function including a time, amplitude point on said signal and the values between a pair of successive upper and lower limiting lines including said point, and means responsive to said signal and said function for reading out another time, amplitude point on said signal only when the value of said function differs from the value of the signal by at least a predetermined amount, said limiting lines converging to a line determined by the value of said signal.

3. In a telemetry system for transmitting data indicative of a monitored signal to a remote location, comprising means for sampling the values of said data $y_1, y_2 \ldots y_n$ at predetermined time intervals $t_1, t_2 \ldots t_n$, means responsive to said sampling means for establishing a plurality of upper and lower limit lines 1U, 1L, 2U, 2L, . . . NU, NL, each of said lines including the point $y_1$, the $k$th upper limit line, KU, including the point $y_k+\alpha$, the $k$th lower limit line, KL, including the point $y_k-\alpha$, where $\alpha$ is a predetermined value and K is any integer between 1 and N, means responsive to said slopes and $y_1$ for deriving a set of permissible values having said limiting lines as its outer boundary, and means for deriving an indication when $y_k$ is outside said set of permissible values.

4. The system of claim 3 further including means for reading out $y_{k-1}$ and adjusting the value of $y_1$ to $y_{k-1}$ only in response to the derivation of said indication.

5. The system of claim 3 further including means responsive to KU and KL for computing the slopes of the lower and upper limit lines, and means responsive to the computed slope values for always converging said permissible values into a set approaching a straight line.

No references cited.

NEIL C. READ, *Primary Examiner.*

THOMAS B. HABECKER, *Examiner.*